US012315271B2

United States Patent
Ambrus et al.

(10) Patent No.: US 12,315,271 B2
(45) Date of Patent: May 27, 2025

(54) MONOCULAR OBJECT DETECTION VIA END-TO-END DIFFERENTIABLE PIPELINE

(71) Applicants: TOYOTA RESEARCH INSTITUTE, INC., Los Altos, CA (US); THE BOARD OF TRUSTEES OF THE LELAND STANFORD JUNIOR UNIVERSITY, Stanford, CA (US)

(72) Inventors: Rares Andrei Ambrus, San Francisco, CA (US); Or Litany, Sunnyvale, CA (US); Vitor Guizilini, Santa Clara, CA (US); Leonidas Guibas, Palo Alto, CA (US); Adrien David Gaidon, Mountain View, CA (US); Jie Li, San Jose, CA (US)

(73) Assignees: TOYOTA RESEARCH INSTITUTE, INC., Los Altos, CA (US); THE BOARD OF TRUSTEES OF LELAND STANDFORD JUNIOR UNIVERSITY, Stanford, CA (US)

( * ) Notice: Subject to any disclaimer, the term of this patent is extended or adjusted under 35 U.S.C. 154(b) by 353 days.

(21) Appl. No.: 17/543,135

(22) Filed: Dec. 6, 2021

(65) Prior Publication Data
US 2023/0177849 A1 Jun. 8, 2023

(51) Int. Cl.
*G06V 20/64* (2022.01)
*G06T 7/50* (2017.01)
*G06V 20/56* (2022.01)

(52) U.S. Cl.
CPC ............... *G06V 20/64* (2022.01); *G06T 7/50* (2017.01); *G06V 20/56* (2022.01); *G06T 2207/20081* (2013.01); *G06T 2207/30252* (2013.01)

(58) Field of Classification Search
None
See application file for complete search history.

(56) References Cited

U.S. PATENT DOCUMENTS

2023/0219585 A1* 7/2023 Eiras ................... G05D 1/0214
701/25

OTHER PUBLICATIONS

Pek, Christian, et al. "CommonRoad Drivability Checker: Simplifying the Development and Validation of Motion Planning Algorithms." 2020 IEEE Intelligent Vehicles Symposium (IV), 2020, pp. 1013-1020. IEEE Xplore, https://doi.org/10.1109/IV47402.2020.9304544. (Year: 2020).*

Heylen, Jonas, et al. "Monocinis: Camera independent monocular 3d object detection using instance segmentation." Proceedings of the IEEE/CVF International Conference on Computer Vision. 2021. (Year: 2021).*

(Continued)

*Primary Examiner* — Matthew C Bella
*Assistant Examiner* — Johnny B Duong
(74) *Attorney, Agent, or Firm* — SEYFARTH SHAW LLP

(57) ABSTRACT

A method for 3D object detection is described. The method includes concurrently training a monocular depth network and a 3D object detection network. The method also includes predicting, using a trained monocular depth network, a monocular depth map of a monocular image of a video stream. The method further includes inferring a 3D point cloud of a 3D object within the monocular image according to the predicted monocular depth map. The method also includes predicting 3D bounding boxes from a selection of 3D points from the 3D point cloud of the 3D object based on a selection regression loss.

15 Claims, 7 Drawing Sheets

(56) References Cited

OTHER PUBLICATIONS

Lu, Yawen, et al. "A Geometric Convolutional Neural Network for 3D Object Detection." 2019 IEEE Global Conference on Signal and Information Processing (GlobalSIP), 2019, pp. 1-5. IEEE Xplore, https://doi.org/10.1109/GlobalSIP45357.2019.8969077. (Year: 2019).*
Cheng, Bowen, et al. Back-Tracing Representative Points for Voting-Based 3D Object Detection in Point Clouds. arXiv:2104.06114, arXiv, Apr. 14, 2021. arXiv.org, https://doi.org/10.48550/arXiv.2104.06114. (Year: 2021).*
Heylen, Jonas, et al. "MonoCInIS: Camera Independent Monocular 3D Object Detection using Instance Segmentation." 2021 IEEE/CVF International Conference on Computer Vision Workshops (ICCVW). IEEE, 2021. (Year: 2021).*
Balatkan, Eren, and Furkan Kıraç. "Improving regression performance on monocular 3D object detection using bin-mixing and sparse voxel data." 2021 6th International Conference on Computer Science and Engineering (UBMK). IEEE, 2021. (Year: 2021).*
Xiang, Yu, et al. "Posecnn: A convolutional neural network for 6d object pose estimation in cluttered scenes." arXiv preprint arXiv:1711.00199 (2017). (Year: 2017).*
Xie, Qian, et al. "Venet: Voting enhancement network for 3d object detection." Proceedings of the IEEE/CVF International Conference on Computer Vision. 2021. (Year: 2021).*
Rich, Alexander, et al. 3DVNet: Multi-View Depth Prediction and Volumetric Refinement. arXiv:2112.00202, arXiv, Dec. 1, 2021. arXiv.org, https://doi.org/10.48550/arXiv.2112.00202. (Year: 2021).*
Chu, Xiaomeng, et al. "Neighbor-vote: Improving monocular 3d object detection through neighbor distance voting." Proceedings of the 29th ACM International Conference on Multimedia. 2021. (Year: 2021).*
Vianney, Jean Marie Uwabeza, Shubhra Aich, and Bingbing Liu. "Refinedmpl: Refined monocular pseudolidar for 3d object detection in autonomous driving." arXiv preprint arXiv: 1911.09712 (2019). (Year: 2019).*
Guizilini, et al. "Robust Semi-Supervised Monocular Depth Estimation With Reprojected Distances." In Conference on Robot Learning, pp. 503-512. PMLR, 2020.
Qi, et al., "Deep hough voting for 3D object detection in point clouds." In Proceedings of the IEEE International Conference on Computer Vision, pp. 9277-9286. 2019.
Weng, et al., "Monocular 3d object detection with pseudo-lidar point cloud." In Proceedings of the IEEE International Conference on Computer Vision Workshops, 2019.
Qian, et al., "End-to-end Pseudo-LiDAR for image-based 3d object detection", In Proceedings of the IEEE/CVF Conference on Computer Vision and Pattern Recognition, 2020, pp. 5881-5890.
Lang, et al., "Pointpillars: Fast encoders for object detection from point clouds", In Proceedings of the IEEE Conference on Computer Vision and Pattern Recognition, 2019, pp. 12697-12705.
Vasiljevic, et al., "Neural ray surfaces for self-supervised learning of depth and ego-motion", arXiv:2008.06630, 2020.
Wang, et al., "Pseudo-lidar from visual depth estimation: Bridging the gap in 3d object detection for autonomous driving." In Proceedings of the IEEE Conference on Computer Vision and Pattern Recognition, pp. 8445-8453. 2019.
Sistu, et al., "NeurAll: Towards a Unified Visual Perception Model for Automated Driving", ArXiv1902.03589, Jul. 17, 2019.
Mordan, et al., "Revisiting Multi-Task Learning with ROCK: a Deep Residual Auxiliary Block for Visual Detection", 32nd Conference on Neural Information Processing Systems (NeurIPS 2018), Montreal, Canada.

* cited by examiner

MONOCULAR OBJECT DETECTION VIA END-TO-END DIFFERENTIABLE PIPELINE

BACKGROUND

Field

Certain aspects of the present disclosure generally relate to machine learning and, more particularly, a system and method for monocular object detection via an end-to-end differentiable pipeline.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and have become a reality in this decade. The ability to reconstruct the structure of a scene with high-accuracy is fundamental to ensuring robust autonomous navigation. Additionally, detecting objects and accurately locating them in 3D space is a prerequisite for many robotic and autonomous driving tasks. Techniques for facilitating and improving the task of detecting objects in 3D space from monocular camera images are desired. Specifically, a method that bridges monocular 3D reconstruction and 3D object detection based on point cloud data for enabling end-to-end learning of 3D object detectors directly from camera images is desired.

SUMMARY

A method for 3D object detection is described. The method includes concurrently training a monocular depth network and a 3D object detection network. The method also includes predicting, using a trained monocular depth network, a monocular depth map of a monocular image of a video stream. The method further includes inferring a 3D point cloud of a 3D object within the monocular image according to the predicted monocular depth map. The method also includes predicting 3D bounding boxes from a selection of 3D points from the 3D point cloud of the 3D object based on a selection regression loss.

A non-transitory computer-readable medium having program code recorded thereon for 3D object detection is described. The program code is executed by a processor. The non-transitory computer-readable medium includes program code to concurrently train a monocular depth network and a 3D object detection network. The non-transitory computer-readable medium also includes program code to predict, using a trained monocular depth network, a monocular depth map of a monocular image of a video stream. The non-transitory computer-readable medium further includes program code to infer a 3D point cloud of a 3D object within the monocular image according to the predicted monocular depth map. The non-transitory computer-readable medium also includes program code to predict 3D bounding boxes from a selection of 3D points from the 3D point cloud of the 3D object based on a selection regression loss.

A system for 3D object detection is described. The system includes a monocular networks training module to concurrently train a monocular depth network and a 3D object detection network. The system also includes a monocular depth map prediction module to predict, using a trained monocular depth network, a monocular depth map of a monocular image of a video stream. The system further includes program code to infer a 3D point cloud of a 3D object within the monocular image according to the predicted monocular depth map. The system also includes a 3D bounding box module to predict 3D bounding boxes from a selection of 3D points from the 3D point cloud of the 3D object based on a selection regression loss.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
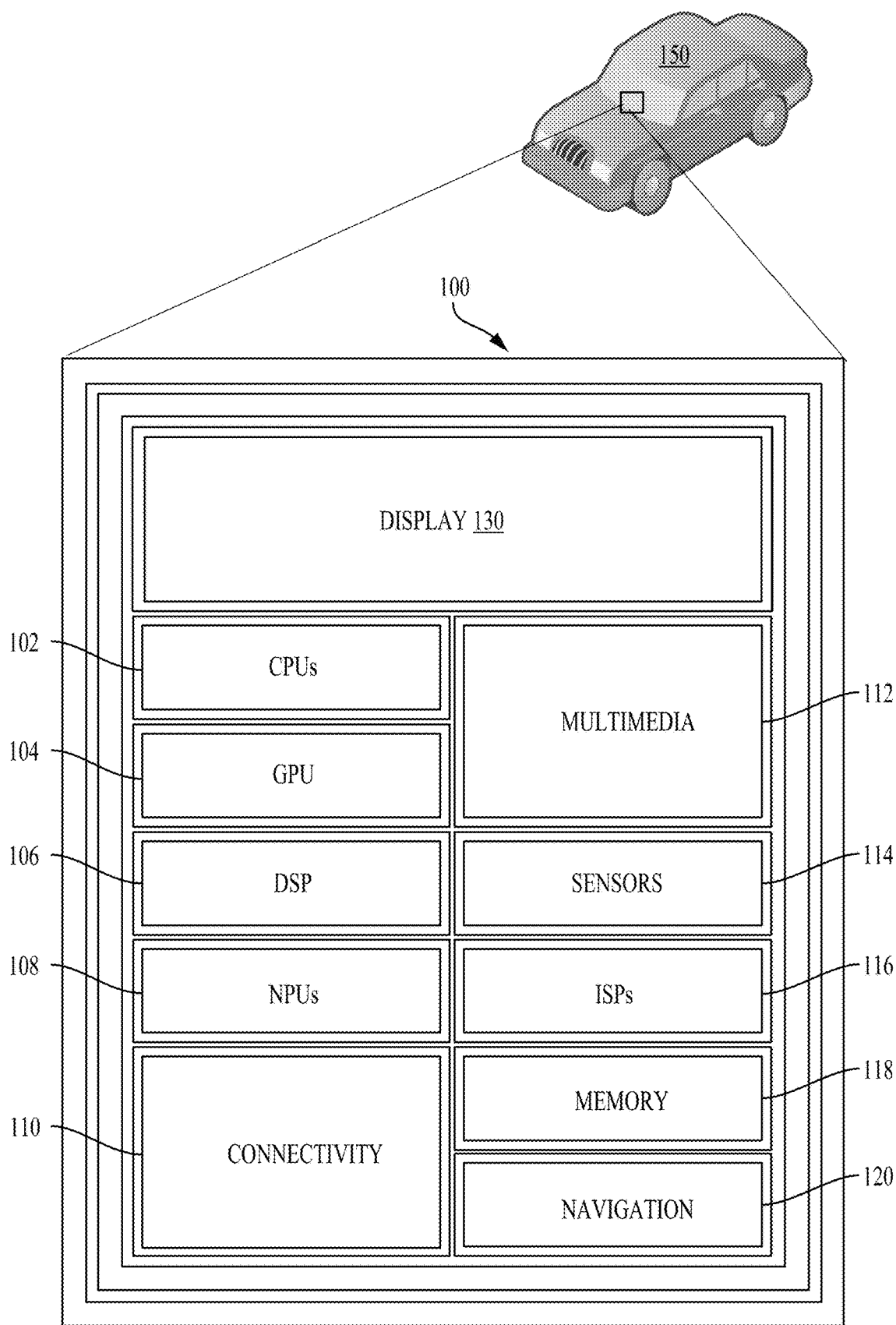
FIG. 1 illustrates an example implementation of designing a system using a system-on-a-chip (SOC) for monocular 3D reconstruction and 3D object detection, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, such as driverless cars and robots, are quickly evolving and have become a reality in this decade. The ability to reconstruct the structure of a scene with high-accuracy is fundamental to ensuring robust autonomous navigation. Additionally, detecting objects and accurately locating them in 3D space is a prerequisite for many robotic and autonomous driving tasks. Techniques for facilitating and improving the task of detecting objects in 3D space from monocular camera images are desired. Specifically, a method that bridges monocular 3D reconstruction and 3D object detection based on point cloud data for enabling end-to-end learning of 3D object detectors directly from camera images is desired.

Traditional approaches to monocular 3D reconstruction rely on hand-engineered features to reliably reconstruct scenes from camera imagery. More recently, deep learning approaches have shown considerable promise in eliminating these hand-engineered features for further improving 3D reconstruction, and have especially helped in ill-posed regimes (e.g., reconstructing textureless regions, or geometrically under-determined regimes). A great number of learning-based depth and pose estimation algorithms have been proposed in recent years, both in self-supervised and supervised settings, such as state-of-the-art methods for monocular depth estimation. These conventional methods aim at detecting 3D objects using the monocular depth (sometimes referred to as "pseudo-lidar" based methods). While these methods show promising results, the first task of monocular depth estimation followed by the second task of object detection are disconnected in the optimization process.

Aspects of the present disclosure are directed to a new method that allows training of a 3D object detection network and the monocular depth prediction network in an end-to-end differentiable pipeline. While traditionally these two components are separate, aspects of the present disclosure are directed to a learning component that allows for simultaneous training of both the 3D object detection network and the monocular depth prediction network. One advantage of simultaneously training both networks is that all learnable elements are jointly optimized for the end task of 3D object detection.

Some aspects of the present disclosure combine depth predictions with a 3D object detection framework that relies on a differential scheme that operates directly on the 3D points, while avoiding discretization operations. While the two tasks are decoupled, in one configuration, a learning component ties the two networks together in an optimization framework, allowing jointly optimizing of the two networks for the task of 3D object detection.

FIG. 1 illustrates an example implementation of the aforementioned system and method for monocular 3D reconstruction and 3D object detection using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for monocular visual odometry in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
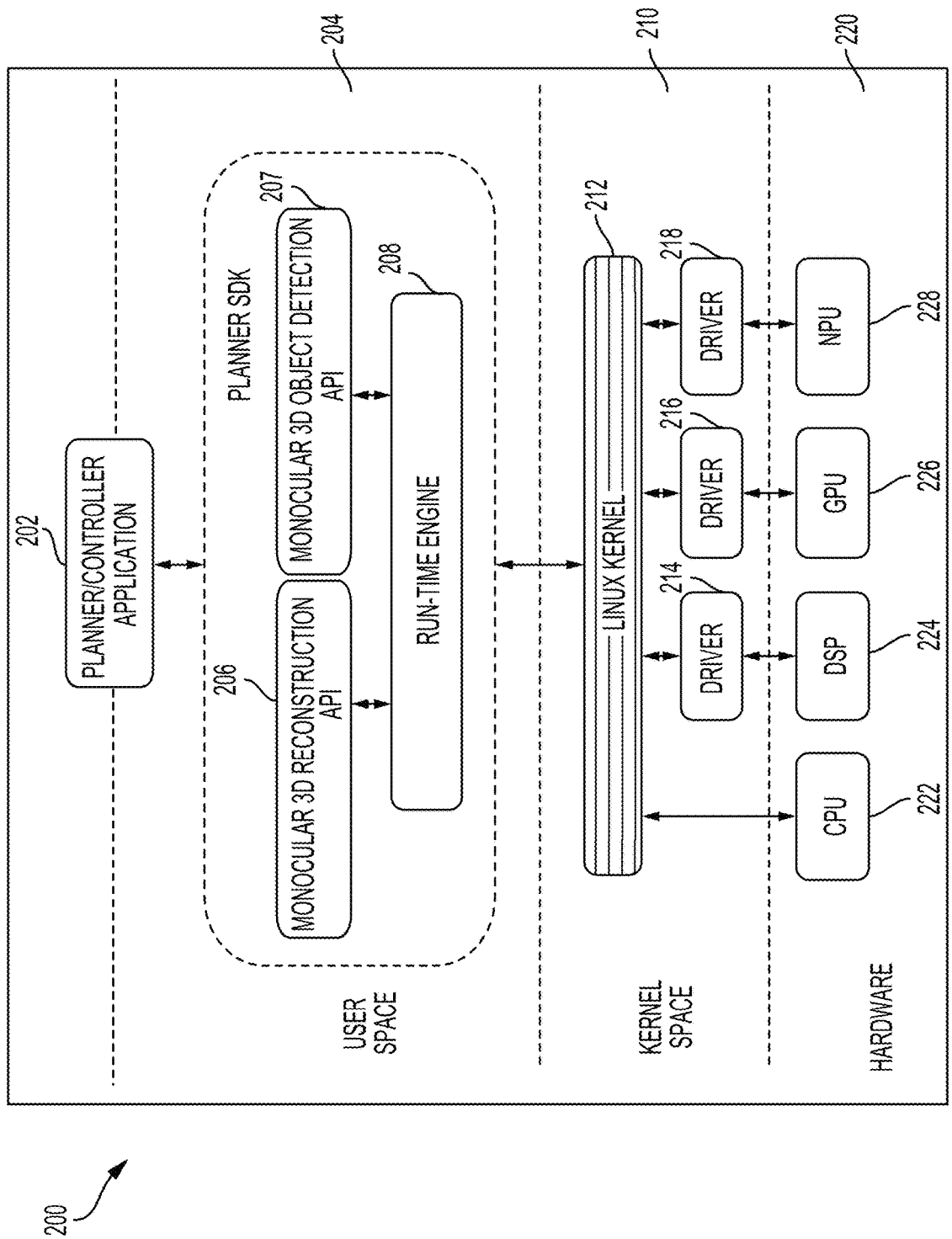
FIG. 2 is a block diagram illustrating a software architecture that may modularize functions for monocular 3D reconstruction and 3D object detection, according to aspects of the present disclosure.

FIG. 2 is a block diagram illustrating a software architecture 200 that may modularize functions for monocular 3D reconstruction and monocular 3D object detection in subsequent frames of a video stream, according to aspects of the present disclosure. Using the architecture, a planner/controller application 202 may be designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for monocular 3D reconstruction and monocular 3D object detection in frames of a video stream captured by a monocular camera of an ego vehicle. The planner/controller application 202 may make a request to compile program code associated with a library defined in a monocular 3D reconstruction application programming interface (API) 206 for monocular 3D reconstruction. The planner/controller application 202 may make a request to compile program code associated with a library defined in a monocular 3D object detection API 207 for the task of detecting 3D objects in monocular frames of a video stream captured by an autonomous agent.

A run-time engine 208, which may be compiled code of a runtime framework, may be further accessible to the planner/controller application 202. The planner/controller application 202 may cause the run-time engine 208, for example, to perform tracking of detecting semantic keypoints in subsequent frames of a monocular (single-camera) video stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
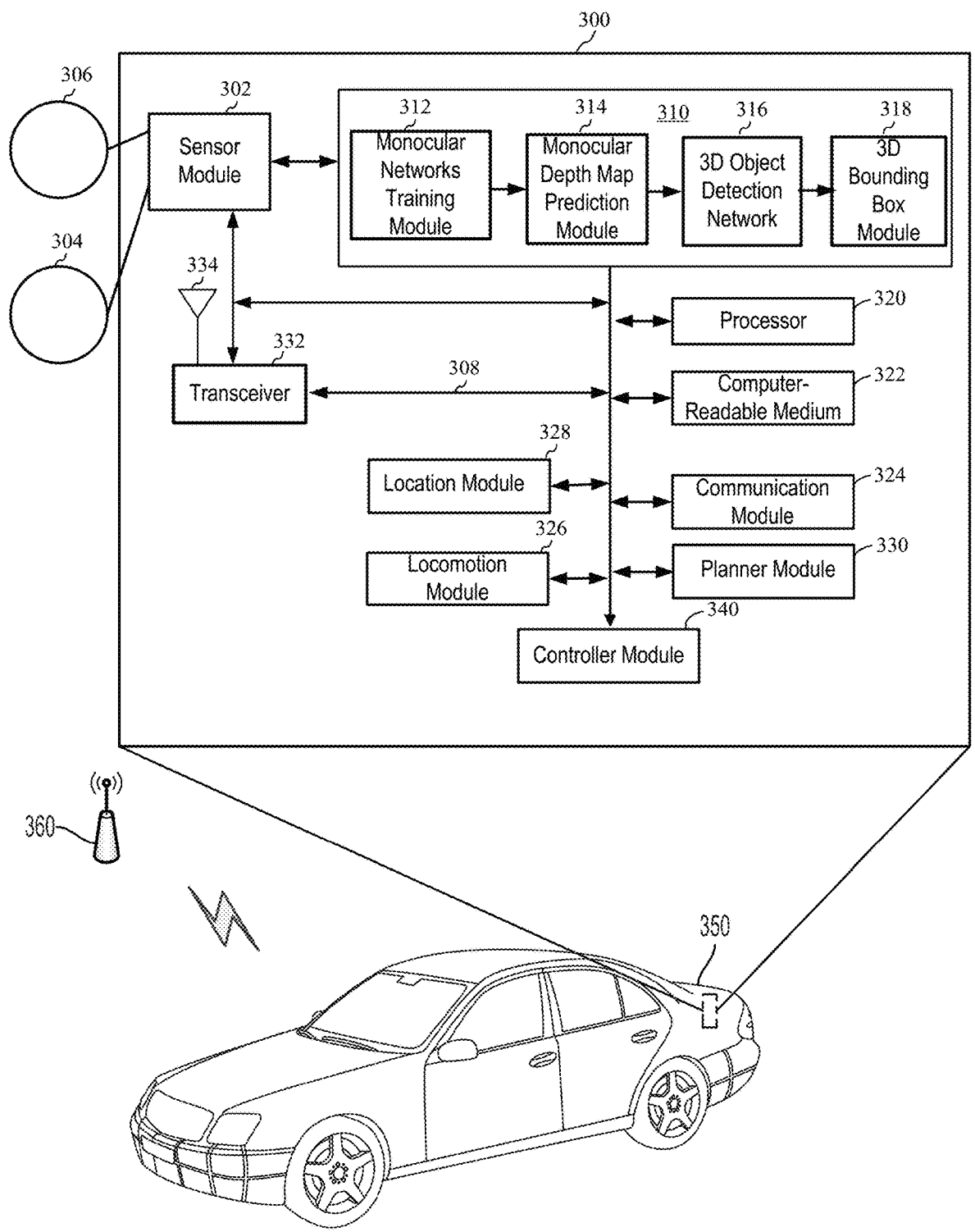
FIG. 3 is a diagram illustrating an example of a hardware implementation for a monocular 3D reconstruction and 3D object detection system, according to aspects of the present disclosure.

FIG. 3 is a diagram illustrating an example of a hardware implementation for a monocular 3D reconstruction and 3D object detection system 300, according to aspects of the present disclosure. The monocular 3D reconstruction and 3D object detection system 300 may be configured for planning and control of an ego vehicle in response to 3D object detection within subsequent frames of a monocular (single-camera) video stream captured during operation of a car 350.

The monocular 3D reconstruction and 3D object detection system 300 may be a component of a vehicle, a robotic device, or other device. For example, as shown in FIG. 3, the monocular 3D reconstruction and 3D object detection system 300 is a component of the car 350. Aspects of the present disclosure are not limited to the monocular 3D reconstruction and 3D object detection system 300 being a component of the car 350, as other devices, such as a bus, motorcycle, or other like vehicle, are also contemplated for using the monocular 3D reconstruction and 3D object detection system 300. The car 350 may be autonomous or semi-autonomous.

The monocular 3D reconstruction and 3D object detection system 300 may be implemented with an interconnected architecture, represented generally by an interconnect 308. The interconnect 308 may include any number of point-to-point interconnects, buses, and/or bridges depending on the specific application of the monocular 3D reconstruction and 3D object detection system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The monocular 3D reconstruction and 3D object detection system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The monocular 3D reconstruction and 3D object detection system 300 includes the processor 320 coupled to the computer-readable medium 322. The processor 320 performs processing, including the execution of software stored on the computer-readable medium 322 to provide keypoint tracking functionality, according to the present disclosure. The software, when executed by the processor 320, causes the monocular 3D reconstruction and 3D object detection system 300 to perform the various functions described for ego vehicle perception based on semantic keypoint tracking between frame from video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the monocular 3D reconstruction and 3D object detection system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The monocular 3D reconstruction and 3D object detection system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

The ability to reconstruct the structure of a scene with high-accuracy is fundamental to ensuring robust autonomous navigation of an ego vehicle, such as the car 350. Additionally, detecting objects and accurately locating them in 3D space is a prerequisite for many robotic and autonomous driving tasks of the car 350. Techniques for facilitating and improving the task of detecting objects in 3D space from monocular camera images are desired. Specifically, a method that bridges monocular 3D reconstruction and 3D object detection based on point cloud data for enabling end-to-end learning of 3D object detectors directly from camera images capture by the car 350 is desired.

As shown in FIG. 3, the ego perception module 310 includes a monocular networks training module 312, a monocular depth map prediction module 314, a 3D object detection network 316, and a 3D bounding box module 318. The monocular networks training module 312, the monocular depth map prediction module 314, the 3D object detection network 316, and the 3D bounding box module 318 may be components of a same or different artificial neural network. The monocular networks training module 312 and the 3D object detection network 316 may be implemented using a convolutional neural network, such as a deep convolutional neural network. The ego perception module 310 receives a data stream from the first sensor 304 and/or the second sensor 306. The data stream may include a 2D RGB image from the first sensor 304 and/or the second sensor 306. The data stream may include multiple frames, such as image frames. In this configuration, the first sensor 304 captures monocular (single camera) 2D RGB images from which a monocular depth map is predicted by the monocular depth map prediction module 314 using the monocular networks training module 312.

The ego perception module 310 is configured to leverage the predicted monocular depth map for enabling a monocular 3D reconstruction of the monocular RGB images received from the first sensor 304 or the second sensor 306. The 3D object inference network 316 and the 3D bounding box module 318 predict 3D object bounding boxes directly from the predicted monocular depth map. According to aspects of the present disclosure, the monocular depth map prediction module 314 predicts a monocular depth map through depth regression loss using the monocular depth map prediction module 314.

In aspects of the present disclosure, the 3D object detection network 316 is trained to infer a 3D point cloud of a 3D object within the monocular image according to the predicted monocular depth map. As described, a 3D point cloud is a set of data points in space. Each point is represented by a set of X, Y, and Z coordinates, and the points of the point cloud may represent a 3D object. In some aspects of the present disclosure, the 3D object detection network 316 is also trained to perform seed selection and vote prediction according to a voting scheme (e.g., Hough voting) The 3D bounding box module 318 detects 3D objects directly from a 3D point cloud, the seed selection, and the voting prediction using a vote regression loss. In aspects of the present disclosure, the vote regression loss is provided as feedback to the monocular depth map prediction module 314. In a conventional system, the monocular depth map prediction module 314 is optimized solely using ground truth depth. Aspects of the present disclosure use a signal derived from differences between the bounding box prediction of the 3D bounding box module 318 and the ground truth object bounding boxes to update the monocular networks training module 312.

In some aspects of the present disclosure, the monocular depth map prediction module 314 predicts a monocular depth (monodepth) map from which a 3D point cloud is generated for 3D object detection by the 3D object detection network 316. According to aspects of the present disclosure, the ego perception module 310 provides a novel learning component that links the predicted depth map with a bounding box selection scheme of the 3D bounding box module 318. Linking the predicted depth map with the bounding box selection scheme enables end-to-end differentiable learning of both a monocular depth network and the 3D object inference network 316 in the same optimization. This aspect of the present disclosure provides a learning scheme that links monocular depth prediction with the selecting scheme of the final 3D bounding box regression.

In some aspects of the present disclosure, the 3D bounding box module 318 is configured using a voting scheme for selecting the final 3D bounding boxes based on the 3D point cloud, the seed, and the voting predictions from the 3D object detection network 316. According to this aspect of the present disclosure, a ground truth displacement between a seed position and a vote is computed online given the predicted monocular depth map and the 3D point cloud from the 3D object detection network 316. As a result, the monocular networks training module 312 jointly trains a monocular depth map prediction network and the 3D object detection network 316. In this example, the 3D bounding box module 318 selects the predicted final 3D bounding boxes by refining the seed selection and voting prediction of the voting scheme (e.g., Hough voting) to enable autonomous vehicle operation, as shown in FIG. 4.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Figure 4:
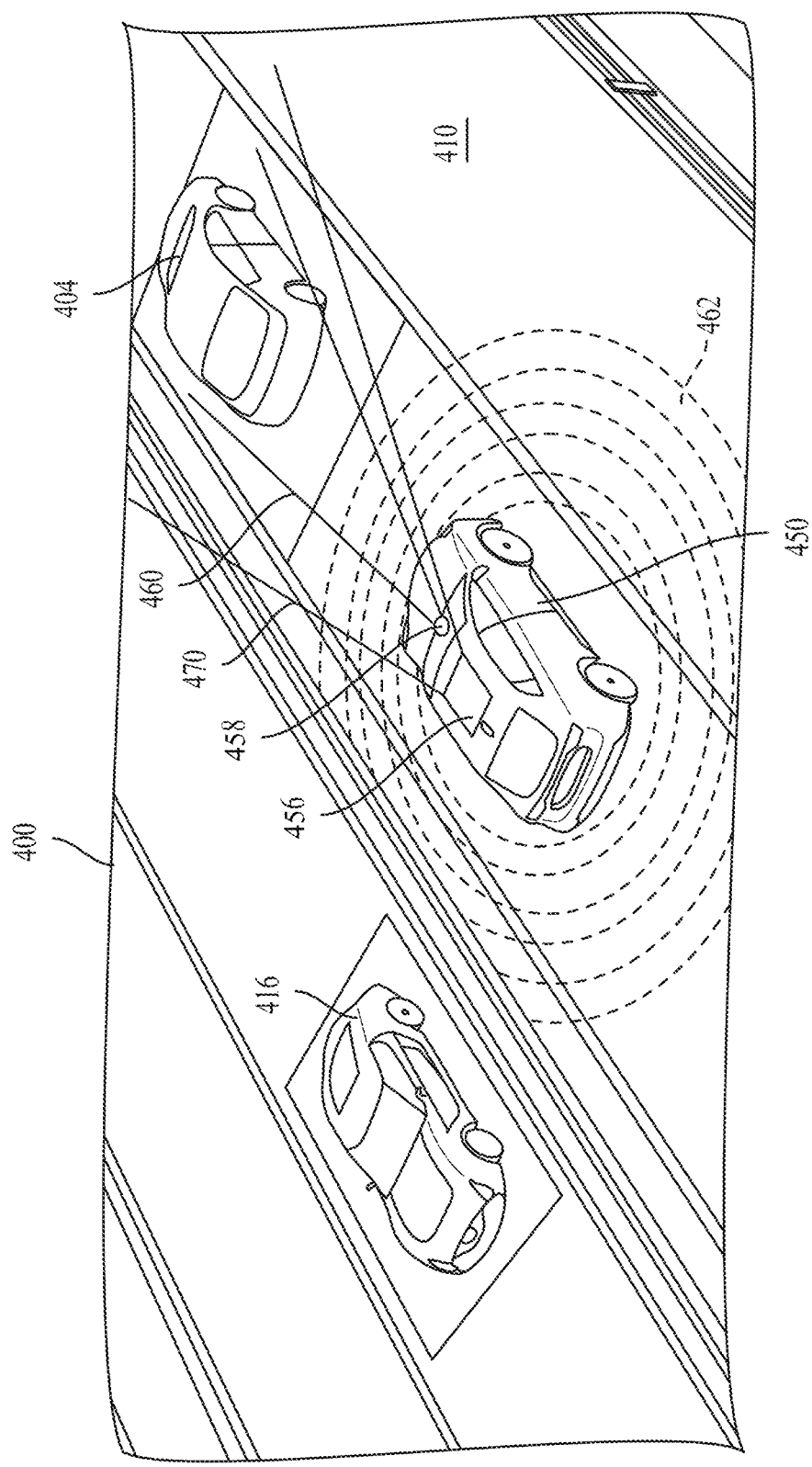
FIG. 4 is a drawing illustrating an example of an ego vehicle in an environment, according to aspects of the present disclosure.

FIG. 4 illustrates an example of an ego vehicle 450 (e.g., the car 350) in an environment 400 according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 458, such as a 2D RGB camera, and a second sensor 456. The second sensor 456 may be another RGB camera or another type of sensor.

In one configuration, the 2D camera 458 captures a 2D image that includes objects in the 2D camera's 458 field of view 460. The second sensor 456 may generate one or more output streams. The 2D image captured by the 2D camera includes a 2D image of the first vehicle 404, as the first vehicle 404 is in the 2D camera's 458 field of view 460. A field of view 470 of the second sensor 456 is also shown.

The information obtained from the second sensor 456 and the 2D camera 458 may be used to navigate the ego vehicle 450 along a route when the ego vehicle 450 is in an autonomous mode. The second sensor 456 and the 2D camera 458 may be powered from electricity provided from the vehicle's 450 battery (not shown). The battery may also power the vehicle's motor. The information obtained from the second sensor 456 and the 2D camera 458 may be used to generate a 3D representation of an environment.

Light detection and ranging (LIDAR) sensors are the sensor of choice for most self-driving car developers because they provide reliable and accurate range data at large distances. In addition, LIDAR sensors are used for a wide variety of applications within the self-driving car ecosystem (e.g., mapping, localization, object detection, and last but not least, safety critical evasive maneuvers. As shown in FIG. 4, the second sensor 456 may be implemented using either a Velodyne or Luminar LIDAR sensor to build a 3D spatial representation of the local world around the ego vehicle 450. While these sensors have shown strong performance, especially in high-dynamic range regimes, they are generally limiting due to the sparse nature of the 3D reconstructions produced. Furthermore, the cost of using LIDAR sensors currently pose an economic challenge for global scale deployments.

A number of manufacturers are looking at replacing LIDAR sensors with cameras, such as the 2D camera 458 for self-driving cars, such as the ego vehicle 450. In particular, the 2D camera 458 can provide both a dense semantic and spatial understanding of the scene by reasoning across space (e.g., stereo, multi-camera) and time (e.g., multi-view reconstruction). Aspects of the present disclosure are directed to a self-supervised mechanism for image-based depth estimation by bootstrapping geometric constraints inherent in robots, or via sparse depth labels from calibrated LIDAR sensors. In particular, aspects of the present disclosure jointly optimizing both the monocular networks training module 312 and the 3D object detection network 316 to enforce task level consistency in the output of the two networks shown in FIG. 3.

Aspects of the present disclosure improve upon self-supervised depth and ego-motion learning to provide an end-to-end differentiable 3D object detection network from monocular images. Aspects of the present disclosure bypasses common point discretization steps and operate directly with the raw depth predicted from monocular images. Longer term benefits of the present disclosure include reconstruction and understanding of scenes from monocular depth prediction and ego-motion estimation. The ability to bootstrap and learn from other calibrated LIDAR or stereo camera sensors eventually benefits fusion stages for 3D spatial reconstruction (either from single/multi-view monocular imagery, or from both LiDAR and monocular imagery combined). The potential long-term implications for an accurate single-image depth estimation model are considerable.

Some aspects of the present disclosure combine depth predictions with a 3D object detection framework that relies on a differential scheme that operates directly on the 3D points, while avoiding discretization operations. While the two tasks are decoupled, in one configuration, a learning component ties the two networks together in a optimization framework, allowing jointly optimizing of the two networks for the task of 3D object detection.

Figure 5:
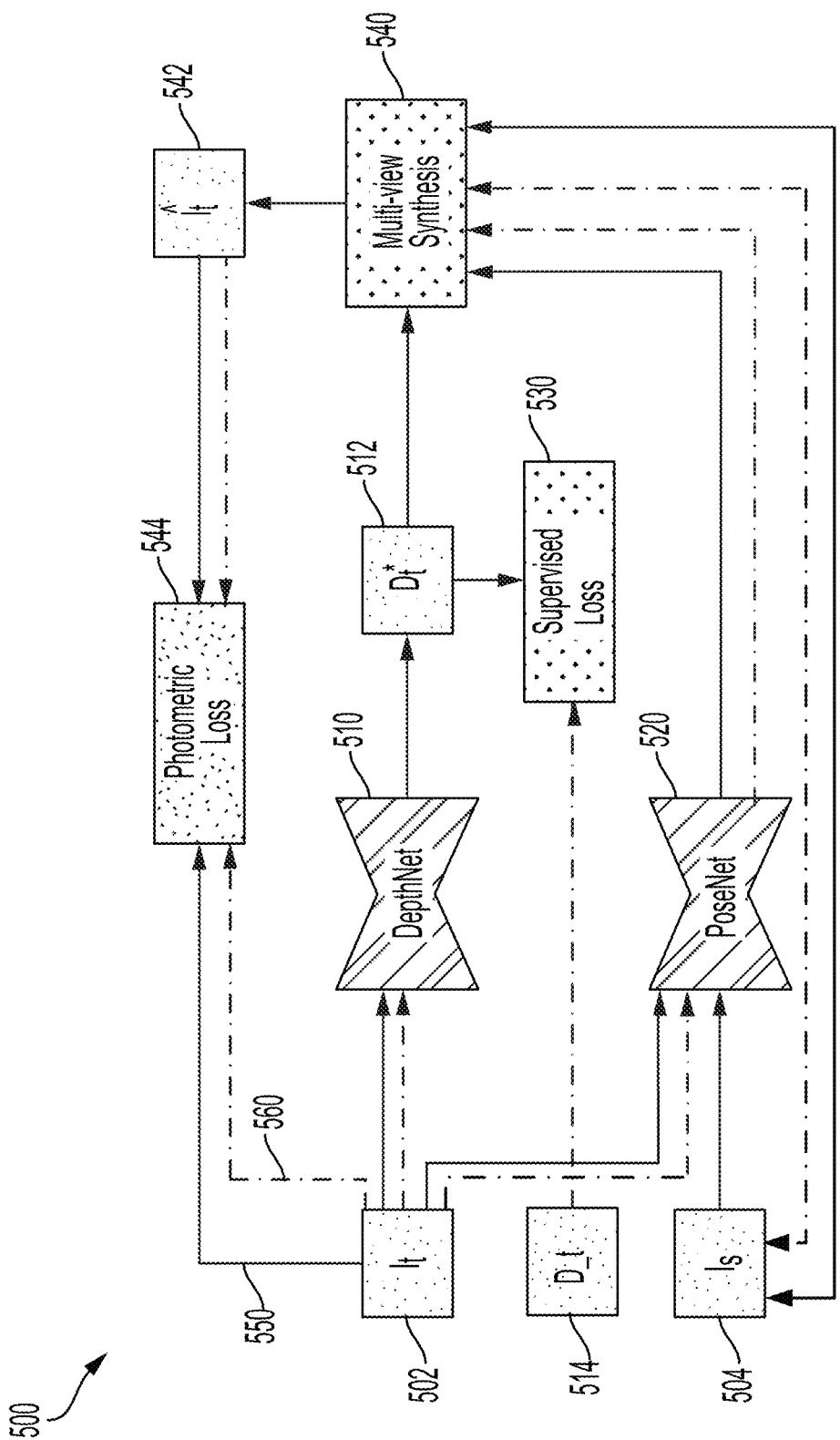
FIG. 5 is a block diagram illustrating a monocular 3D reconstruction and 3D object detection system between monocular images of a video stream, according to aspects of the present disclosure.

FIG. 5 is a block diagram illustrating a semi-supervised, monocular depth estimation framework 500 for monocular 3D reconstruction and 3D object detection, according to aspects of the present disclosure. In one aspect of the present disclosure, the monocular depth estimation framework 500 is used to implement the monocular depth map prediction module 314 of the ego perception module 310 shown in FIG. 3 using, for example, a semi-supervised configuration.

In one configuration, the monocular depth estimation framework 500 receives two consecutive images, a target image ($I_t$) 502 and a source image ($I_s$) 504 of a monocular video. In this configuration, the target image $I_t$ 502 is provided as input to a depth network (DepthNet 510), which outputs a monocular depth prediction map 512 (e.g., $D_t^*$). In addition, the context image $I_c$ 504 is provided as input to a pose network (PoseNet 520). The DepthNet 510 may be implemented using an encoder followed by a decoder to provide the monocular depth prediction map 512. In this example, the monocular depth prediction map 512 and a ground truth depth map 514 ($D_t$) are provided to a supervised loss block 530.

In aspects of the present disclosure, two consecutive images (e.g., the target image $I_t$ 502 and the source image $I_s$ 504) are used as input to self-supervise monocular depth learning of the monocular depth estimation framework 500. In this configuration, the DepthNet 510 and the PoseNet 520 are simultaneously trained in an end-to-end process using a combination of the photometric loss block 544 and the multi-view synthesis block 540. The monocular depth estimation framework 500 provides monocular depth map estimation for 3D object detection using a synthesized target image $I_t^*$ 542. In addition, the monocular depth estimation framework 500 is semi-supervised, including self-supervised training paths 550 and semi-supervised reinforcement paths 560 to enable 3D reconstruction, for example, as shown in FIG. 6.

Figure 6:
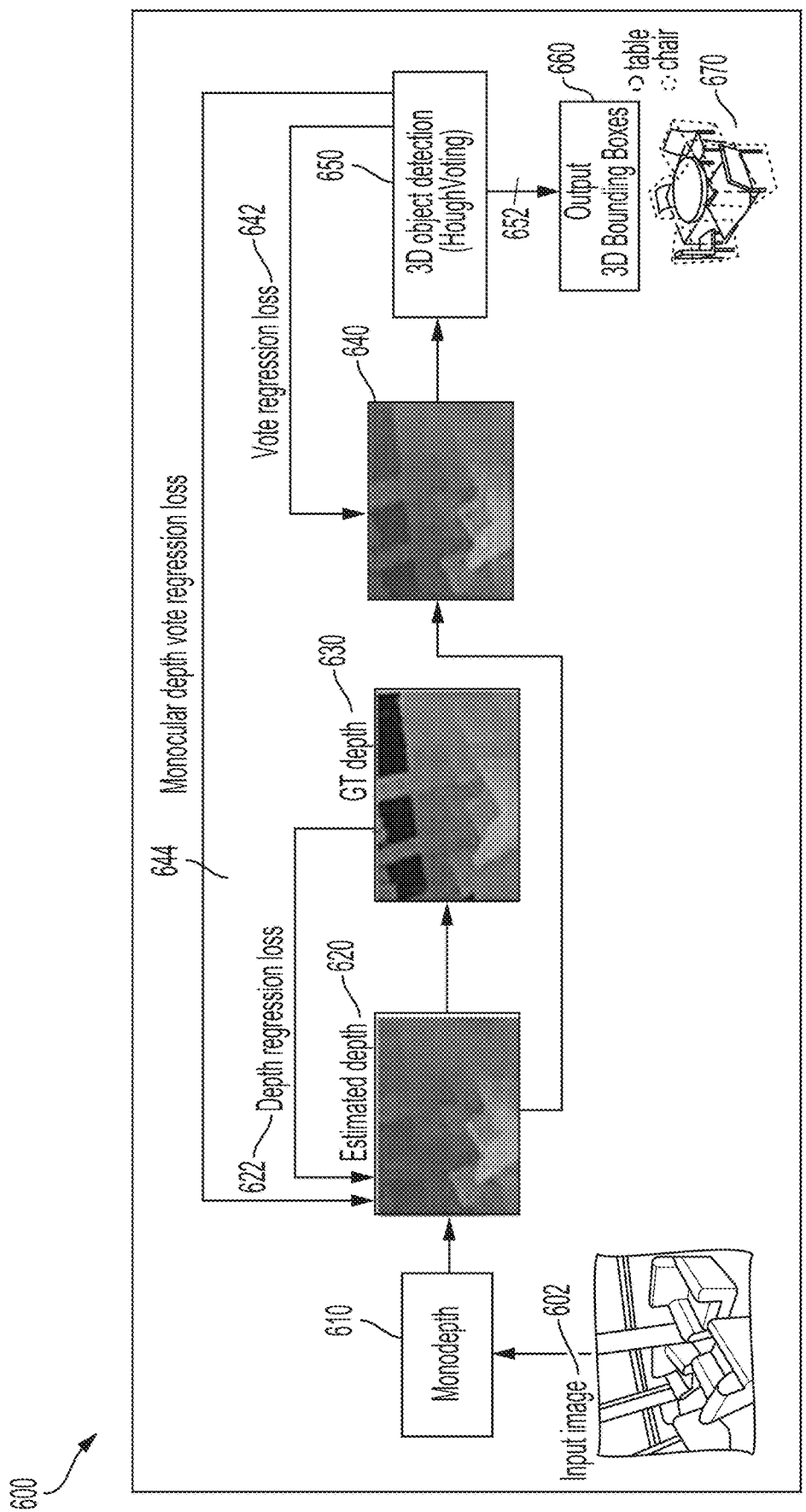
FIG. 6 is a block diagram of a monocular 3D reconstruction and 3D object detection architecture using concurrently trained monocular depth prediction and 3D object detection networks, according to aspects of the present disclosure.

FIG. 6 is a block diagram of a monocular 3D reconstruction and 3D object detection architecture using concurrently trained monocular depth prediction and 3D object detection networks, according to aspects of the present disclosure. In one aspect of the present disclosure, a monocular 3D reconstruction and 3D object detection framework 600 is used to implement the ego perception module 310 shown in FIG. 3 using, for example, the concurrently trained monocular depth prediction and 3D object detection networks. Some aspects of the present disclosure concurrently train a monocular depth prediction network 610 and a 3D object detection network 650. Once trained, a monocular depth map of a monocular image of a video stream is predicted using the trained, monocular depth prediction network 610. The monocular 3D reconstruction and 3D object detection framework 600 infers a 3D point cloud of a 3D object within the monocular image according to the predicted monocular depth map, and selects 3D bounding boxes 670 from the 3D point cloud of the 3D object based on a selection regression loss using a 3D bounding box selection module 660.

In one configuration, the monocular 3D reconstruction and 3D object detection framework 600 is composed of the monocular depth prediction network 610 (e.g., monodepth). In this configuration, the monocular 3D reconstruction and 3D object detection framework 600 is shown receiving an input image 602 of a monocular video stream. In response to the input image 602, the monocular depth prediction network 610 predicts an estimated monocular depth map 620 of the input image 602 of the monocular video stream. During training of the monocular depth prediction network 610, the monocular depth prediction network 610 is optimized based on a ground truth estimated depth map 630 and depth regression loss 622 to refine the estimated monocular depth map 620.

According to aspects of the present disclosure, the estimated monocular depth map 620 is provided to the 3D object detection network 650 of the monocular 3D reconstruction and 3D object detection framework 600. In this configuration, the 3D object detection network 650 is trained to infer a 3D point cloud of a 3D object within the input image 602 according to the estimated monocular depth map 620 to generate a monocular depth point cloud 640. In some aspects of the present disclosure, the 3D object detection network 316 is also trained to perform seed selection and vote prediction 652 according to a voting scheme (e.g., Hough voting) In addition, the 3D bounding box selection module 660 predicts 3D bounding boxes 670 from the monocular depth point cloud 640 of the input image 602, the seed selection, and the voting prediction 652 based on a vote regression loss 642, such as a voting regression loss using Hough voting to finalize selection of the 3D bounding boxes 670.

In this configuration, the 3D object detection network 650 and the monocular depth prediction network 610 are jointly trained in an end-to-end differentiable pipeline of the monocular 3D reconstruction and 3D object detection framework 600. While these two components are traditionally separated, aspects of the present disclosure are directed to simultaneous training of both the 3D object detection network 650 and the monocular depth prediction network 610. In this configuration, the joint training is providing by feeding back a monocular depth vote regression loss 644 from the 3D object detection network 650 to the monocular depth prediction network 610

One advantage of simultaneously training both networks is that all learnable elements are jointly optimized for the end task of 3D object detection. In this aspect of the present disclosure, the monocular depth prediction network 610 is optimized based on a ground truth estimated depth map 630, the depth regression loss 622, and the monocular depth vote regression loss 644. Using both the depth regression loss 622 and the monocular depth vote regression loss 644 from the 3D object detection network 650 improves refining of the estimated monocular depth map 620. As a result, the depth prediction and the 3D object detection are combined to operate directly on the 3D points, which avoids discretization operations.

One aspect of the present disclosure combines monocular depth prediction and differentiable Hough Voting for 3D object detection using the 3D bounding box selection module 660. For example, given an input point cloud (e.g., monocular depth point cloud 640), a set of seed points is selected, and each seed point predicts a vote. The votes are then aggregated and 3D bounding boxes are regressed to predict the 3D bounding boxes 670. This configuration for 3D object detection avoids use of an RGB depth (RGB-D) sensor for monocular 3D reconstruction. Instead, aspects of the present disclosure leverage monocular depth prediction and 3D object bounding box selection directly from an RGB input of the input image 602. This aspect of the present disclosure relies on the monocular depth vote regression loss 644, which is derived from differences between the bounding box prediction and the true object bounding boxes to update the monocular depth prediction network 610. The 3D bounding box selection module 660 jointly optimizes the two networks for the task of 3D object detection. A 3D object detection process is further described in FIG. 7.

Figure 7:
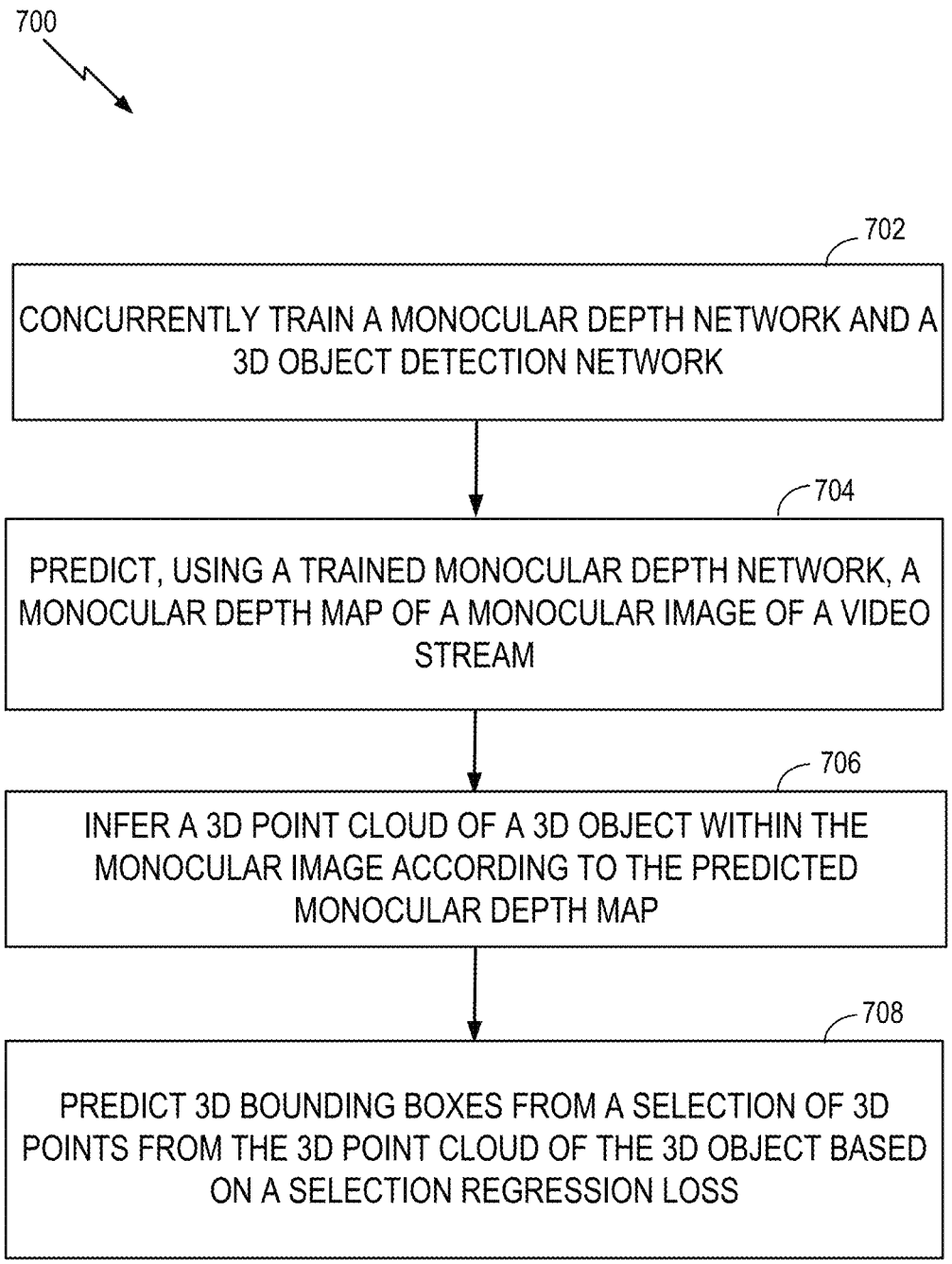
FIG. 7 is a flowchart diagram illustrating a method for 3D object detection, according to aspects of the present disclosure.

FIG. 7 is a flowchart illustrating a method for 3D object detection, according to aspects of the present disclosure. The method 700 begins at block 702, in which a monocular depth network and a 3D object detection network are concurrently trained. For example, as shown in FIG. 6, a monocular 3D reconstruction and 3D object detection framework 600 is used to implement the ego perception module 310 shown in FIG. 3 using, for example, the concurrently trained monocular depth prediction and 3D object detection networks. Some aspects of the present disclosure concurrently train a monocular depth prediction network 610 and a 3D object detection network 650.

At block 704, a monocular depth map of a monocular image of a video stream is predicted using a trained monocular depth network. For example, as shown in FIG. 6, in response to the input image 602, the monocular depth prediction network 610 predicts an estimated monocular depth map 620 of the input image 602 of the monocular video stream. During training of the monocular depth prediction network 610, the monocular depth prediction network 610 is optimized based on a ground truth estimated depth map 630 and depth regression loss 622 to refine the estimated monocular depth map 620.

At block 706, a 3D point cloud of a 3D object within the monocular image is inferred according to the predicted monocular depth map. For example, as shown in FIG. 3, the 3D object detection network 316 is trained to infer a 3D point cloud of a 3D object within the monocular image according to the predicted monocular depth map. As described, a 3D point cloud is a set of data points in space. Each point is represented by a set of X, Y, and Z coordinates, and the points of the point cloud may represent a 3D object. The 3D bounding box module 318 detects 3D objects directly from a 3D point cloud and the predicted monocular depth map using selection regression loss. As shown in FIG. 6, the 3D object detection network 650 is trained to infer a 3D point cloud of a 3D object within the input image 602 according to the estimated monocular depth map 620 to generate a monocular depth point cloud 640.

At block 708, 3D bounding boxes are predicted from a selection of 3D points from the 3D point cloud of the 3D object based on a selection regression loss. For example, as shown in FIG. 3, the 3D bounding box module 318 selects the predicted final 3D bounding boxes using a voting scheme (e.g., Hough voting) to enable autonomous vehicle operation, as shown in FIG. 4. As shown in FIG. 6. monocular depth prediction and differentiable Hough Voting are combined for 3D object detection using the 3D bounding box selection module 660. For example, given an input point cloud (e.g., monocular depth point cloud 640), a set of seed points is selected, and each seed point predicts a vote. The votes are then aggregated and 3D bounding boxes are regressed to predict the 3D bounding boxes 670. Aspects of the present disclosure leverage monocular depth prediction and 3D object bounding box selection directly from an RGB input of the input image 602 using the monocular depth vote regression loss 644, which is derived from differences between the bounding box prediction and the true object bounding boxes to update the monocular depth prediction network 610. The 3D bounding box selection module 660 jointly optimizes two networks for the task of 3D object detection.

The method 700 also includes planning a trajectory of an ego vehicle according to the tracking of the inferred object. The method 700 also includes selecting seed 3D points from a 3D point cloud. The method 700 further includes predicting votes corresponding to a 3D bounding box center of a 3D object. The method 700 also includes computing displacement between predicted votes and a ground truth 3D bounding box center of the 3D object. The method 700 further includes updating a monocular depth point cloud according to the displacements.

Aspects of the present disclosure are directed to jointly training a 3D object detection network and the monocular depth prediction network in an end-to-end differentiable pipeline. One advantage of simultaneously training both networks is that all learnable elements are jointly optimized for the end task of 3D object detection. Some aspects of the present disclosure combine depth predictions with a 3D object detection framework that relies on a differential scheme that operates directly on the 3D points, while avoiding discretization operations. In one configuration, the learning component ties the two networks together in a optimization framework, allowing jointly optimizing of the two networks for the tasks of monocular 3D reconstruction and 3D object detection.

In some aspects of the present disclosure, the method 700 may be performed by the SOC 100 (FIG. 1) or the software architecture 200 (FIG. 2) of the ego vehicle 150 (FIG. 1). That is, each of the elements of method 700 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium.

Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for 3D object detection, comprising:
concurrently training a monocular depth network and a 3D object detection network by updating both the monocular depth network and a 3D object detection network using a vote regression loss between ground truth bounding boxes and vote-based bounding boxes corresponding to a detected 3D object, and updating the monocular depth network using a depth regression loss between a ground truth depth map and an estimated depth map;
predicting, using a trained monocular depth network, a monocular depth map of a monocular image of a video stream;
generating a monocular depth point cloud of a 3D object within the monocular image according to the predicted monocular depth map;
updating the monocular depth point cloud according to the vote regression loss; and
predicting 3D bounding boxes from a selection of 3D points from the updated monocular depth point cloud of the 3D object based on a selection regression loss.

2. The method of claim 1, in which concurrently training comprises:
feeding back the selection regression loss to the monocular depth network; and
training the monocular depth network according to a ground truth depth map and according to ground truth 3D object positions corresponding to the 3D object.

3. The method of claim 2, in which the selection regression loss comprises a combination of a monocular depth selection regression loss and a 3D object detection regression loss according to a trained 3D object detection network.

4. The method of claim 1, in which generating the monocular depth point cloud comprises:
selecting seed 3D points from the 3D point cloud;
predicting votes corresponding to a 3D bounding box center of the 3D object;
computing displacement between predicted votes and a ground truth 3D bounding box center of the 3D object; and
updating the monocular depth point cloud according to the displacements.

5. The method of claim 1, in which concurrently training comprises training the monocular depth network according to a ground truth depth map of the selection regression loss and according to ground truth 3D object positions corresponding to the 3D object, in which the selection regression loss comprises a combination of a monocular depth selection regression loss and a 3D object detection regression loss according to a trained 3D object detection network.

6. The method of claim 1, further comprising:
planning a trajectory of an ego vehicle according to the 3D bounding boxes; and
operating the ego vehicle to follow the trajectory planned according to the 3D bounding boxes.

7. A non-transitory computer-readable medium having program code recorded thereon for 3D object detection, the program code being executed by a processor and comprising:
program code to concurrently train a monocular depth network and a 3D object detection network by program code to update both the monocular depth network and a 3D object detection network using a vote regression loss between ground truth bounding boxes and vote-based bounding boxes corresponding to a detected 3D object, and updating the monocular depth network using a depth regression loss between a ground truth depth map and an estimated depth map;
program code to predict, using a trained monocular depth network, a monocular depth map of a monocular image of a video stream;
program code to generate a monocular depth point cloud of a 3D object within the monocular image according to the predicted monocular depth map;
program code to update the monocular depth point cloud according to the vote regression loss; and
program code to predict 3D bounding boxes from a selection of 3D points from the updated monocular depth point cloud of the 3D object based on a selection regression loss.

8. The non-transitory computer-readable medium of claim 7, in which the program code to concurrently train comprises:
program code to feed back the selection regression loss to the monocular depth network; and
program code to train the monocular depth network according to a ground truth depth map and according to ground truth 3D object positions corresponding to the 3D object.

9. The non-transitory computer-readable medium of claim 8, in which the selection regression loss comprises a combination of a monocular depth selection regression loss and a 3D object detection regression loss.

10. The non-transitory computer-readable medium of claim 7, in which the program code to generate the monocular depth point cloud comprises:
program code to select seed 3D points from the 3D point cloud;
program code to predict votes corresponding to a 3D bounding box center of the 3D object;
program code to compute displacements between predicted votes and a ground truth 3D bounding box center of the 3D object; and
program code to update the monocular depth point cloud according to the displacements.

11. The non-transitory computer-readable medium of claim 7, in which concurrently training comprises program code to train the monocular depth network according to a ground truth depth map of the selection regression loss and according to ground truth 3D object positions corresponding to the 3D object, in which the selection regression loss comprises a combination of a monocular depth selection regression loss and a 3D object detection regression loss.

12. The non-transitory computer-readable medium of claim 7, further comprising:
program code to plan a trajectory of an ego vehicle according to the 3D bounding boxes; and
program code to operate the ego vehicle to follow the trajectory planned according to the 3D bounding boxes.

13. A system for 3D object detection, the system comprising:
- a monocular networks training module to concurrently train a monocular depth network and a 3D object detection network by updating both the monocular depth network and a 3D object detection network using a vote regression loss between ground truth bounding boxes and vote-based bounding boxes corresponding to a detected 3D object, and updating the monocular depth network using a depth regression loss between a ground truth depth map and an estimated depth map;
- a monocular depth map prediction module to predict, using a trained monocular depth network, a monocular depth map of a monocular image of a video stream;
- a 3D object detection network to a monocular depth point cloud of a 3D object within the monocular image according to the predicted monocular depth map and to update the monocular depth point cloud according to the vote regression loss; and
- a 3D bounding box module to predict 3D bounding boxes from a selection of 3D points from the updated monocular depth point cloud of the 3D object based on a selection regression loss.

14. The system of claim 13, in which the selection regression loss comprises a combination of a monocular depth selection regression loss and a 3D object detection regression loss according to a trained 3D object detection network.

15. The system of claim 13, further comprising:
- a planner to plan a trajectory of an ego vehicle according to the 3D bounding boxes; and
- a controller to operate the ego vehicle to follow the trajectory planned according to the 3D bounding boxes.

* * * * *